US010615999B2

(12) United States Patent
Wang et al.

(10) Patent No.: US 10,615,999 B2
(45) Date of Patent: Apr. 7, 2020

(54) VIRTUAL LOCAL AREA NETWORK CONFIGURATION SYSTEM AND METHOD, AND COMPUTER PROGRAM PRODUCT THEREOF

(71) Applicant: Industrial Technology Research Institute, Hsinchu (TW)

(72) Inventors: Tzu-Lin Wang, New Taipei (TW); Ming-Hung Hsu, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 340 days.

(21) Appl. No.: 15/600,781

(22) Filed: May 21, 2017

(65) Prior Publication Data

US 2018/0227170 A1    Aug. 9, 2018

(30) Foreign Application Priority Data

Feb. 7, 2017   (TW) .............................. 106103968 A

(51) Int. Cl.
| | |
|---|---|
| H04L 12/46 | (2006.01) |
| H04L 12/24 | (2006.01) |
| H04L 12/947 | (2013.01) |

(52) U.S. Cl.
CPC ...... *H04L 12/4641* (2013.01); *H04L 41/5054* (2013.01); *H04L 41/12* (2013.01); *H04L 41/5077* (2013.01); *H04L 49/25* (2013.01)

(58) Field of Classification Search
None
See application file for complete search history.

(56) References Cited

U.S. PATENT DOCUMENTS

| | | | |
|---|---|---|---|
| 8,369,333 B2 | 2/2013 | Hao et al. | |
| 2005/0069314 A1* | 3/2005 | De Patre | H04J 14/0227 398/5 |
| 2013/0148666 A1 | 6/2013 | Shimonishi et al. | |

(Continued)

FOREIGN PATENT DOCUMENTS

| | | |
|---|---|---|
| CN | 101695043 | 4/2010 |
| CN | 102857416 | 1/2013 |

(Continued)

OTHER PUBLICATIONS

"Office Action of Taiwan Counterpart Application", dated May 16, 2018, p. 1-p. 5.

(Continued)

*Primary Examiner* — Chirag G Shah
*Assistant Examiner* — Srinivasa R Reddivalam
(74) *Attorney, Agent, or Firm* — JCIPRNET

(57) ABSTRACT

A virtual local area network configuration system, a method and a computer program product thereof are provided. The virtual local area network configuration system includes physical machines running virtual machines, Ethernet switches and a network controller. The network controller deploys VLAN groups according to the physical machines and the virtual machines, creates virtual topologies corresponding to the VLAN groups and assigns VLAN IDs to the VLAN groups, wherein at least two VLAN groups among the VLAN groups have the same VLAN ID.

19 Claims, 14 Drawing Sheets

(56) References Cited

U.S. PATENT DOCUMENTS

| | | | |
|---|---|---|---|
| 2013/0227097 A1* | 8/2013 | Yasuda | H04L 41/0813 709/222 |
| 2014/0365622 A1 | 12/2014 | Iyengar et al. | |
| 2015/0043382 A1 | 2/2015 | Arora et al. | |
| 2015/0043588 A1 | 2/2015 | Kato | |
| 2015/0103824 A1 | 4/2015 | Tanabe | |
| 2016/0065386 A1 | 3/2016 | Hari | |
| 2016/0157149 A1* | 6/2016 | Wang | H04W 36/06 370/237 |
| 2016/0196157 A1* | 7/2016 | Kodama | G06F 9/45558 718/1 |
| 2017/0237647 A1* | 8/2017 | N. | H04L 43/16 709/224 |
| 2017/0279883 A1* | 9/2017 | Shimokuni | H04L 41/0893 |
| 2018/0046489 A1* | 2/2018 | Onoue | G06F 9/45558 |

FOREIGN PATENT DOCUMENTS

| | | |
|---|---|---|
| CN | 103888369 | 6/2014 |
| EP | 2787698 | 10/2014 |
| TW | I543566 | 7/2016 |

OTHER PUBLICATIONS

Sergey Guenender et al.,"NoEncap: Overlay Network Virtualization with no Encapsulation Overheads", SOSR '15 Proceedings of the 1st ACM SIGCOMM Symposium on Software Defined Networking Research Article No. 9, Jun. 17-18, 2015, pp. 1-7.

Xuan Luo et al.,"HADES: A Compatible SDN based Network Virtualization Architecture", The 12th International Conference on Optical Internet Proceedings, Aug. 27-29, 2014, pp. 1-2.

Jon Matias et al.,"Implementing Layer 2 Network Virtualization using OpenFlow: Challenges and Solutions", 2012 European Workshop on Software Defined Networking, Oct. 25-26, 2012, pp. 30-35.

Steven S. W. Lee et al., "Design of SDN based Large Multi-tenant Data Center Networks", 2015 IEEE 4th International Conference on Cloud Networking (CloudNet), Oct. 5-7, 2015, pp. 44-50.

Yang Hu et al.,"NVLAN: A Novel VLAN Technology for Scalable Multi-Tenant Datacenter Networks",2014 Second International Conference on Advanced Cloud and Big Data, Nov. 20-22, 2014,pp. 190-195.

Dan Levin et al.,"Panopticon: Reaping the Benefits of Incremental SDN Deployment in Enterprise Networks", 2014 USENIX Annual Technical Conference, Jun. 19-20, 2014, pp. 333-345.

* cited by examiner

VIRTUAL LOCAL AREA NETWORK CONFIGURATION SYSTEM AND METHOD, AND COMPUTER PROGRAM PRODUCT THEREOF

CROSS-REFERENCE TO RELATED APPLICATION

This application claims the priority benefit of Taiwan application no. 106103968, filed on Feb. 7, 2017. The entirety of the above-mentioned patent application is hereby incorporated by reference herein and made a part of this specification.

TECHNICAL FIELD

The present disclosure relates to a virtual local area network configuration system, a method and a computer program product thereof.

BACKGROUND

With the blooming development of computer technology and Internet, applications of cloud computing are increasingly popularized. The existing network system provides related services of cloud computing by a data center. The data center usually includes a large number of physical machines such as servers. Each physical machine runs multiple virtual machines. In general, one large-scale data center can usually support more than hundred thousands of physical machines and millions of virtual machines. In addition, the data center further includes a large number of switches, such as Ethernet switches, which can form a local area network for transmitting data packets between the physical machines.

Software-Defined Network (SDN) is a mechanism for converting inflexible and closed hardware-based network architecture with distributed control in conventional art into open programmable network architecture with centralized control management. In the SDN network architecture based on OpenFlow protocol, a SDN controller connected to all network devices is configured to update flow control information, including packet forwarding rules (e.g., an output port for forwarding packet or QoS (Quality of Service control) stored in all network devices (e.g., an OpenFlow switch), so as to manage data transmission paths for all connections in the SDN network. In this way, all network devices in the SDN network can process the data packets according to the rules provided by the SDN controller. Because the SDN network controller can control the transmission paths of data packets for all connections in the SDN network, a network throughput can be improved significantly.

A large amount of data traffics often occurs in transmissions within the local area network when the network system becomes increasingly large in the data center. Normally, those traffics belong to different personal or enterprise tenants. In order to satisfy demands on convenience and security of network management and prevent traffics of different tenants from interfering with one another, administrators usually divide the local area network into a plurality of Virtual Local Area Network (VLAN) and assign one virtual local area network identity (VLAN ID) for each local area network. By doing so, switches are able to control the transmission paths of the data packets according to the VLAN ID in the data packet.

However, in the existing network systems, different virtual local area networks are assigned with different VLAN IDs. In other words, one VLAN ID can only be assigned to one virtual local area network in the same network system. Based on the IEEE 802.1Q standard, the length of the VLAN ID is 12 bits, which can mark 4094 different virtual local area networks. Nonetheless, in the network system with a large-scale physical network and a lot of demands on virtual local area networks, demands on more than 4094 virtual local area networks cannot be satisfied under the limitation by the length of the VLAN ID. Therefore, finding a way to break through the limitation caused by the number of the VLAN IDs in order to deploy more virtual local area networks in the network system is one the major issues to be addressed by persons skilled in the art.

SUMMARY

The present disclosure provides a virtual local area network configuration system, a method and a computer program product thereof, which are capable of achieving the effect of increasing the number of the virtual local area networks by using a limited number of the VLAN IDs.

An exemplary embodiment of the present disclosure provides a virtual local area network configuration system, which includes a plurality of physical machines running a plurality of virtual machines; a plurality of Ethernet switches and a network controller. The Ethernet switches are connected to the physical machines through a plurality of links. The network controller is connected to the Ethernet switches. The network controller deploys a plurality of VLAN groups according to locations of the physical machines and the virtual machines. Each VLAN group among the VLAN groups includes at least one physical machine among the physical machines and at least one virtual machine among the virtual machines. The network controller computes and creates a plurality of virtual topologies corresponding to the VLAN groups, and assigns a plurality of VLAN IDs separately to the VLAN groups. The VLAN groups include one VLAN group and another VLAN group, and said one VLAN group and said another VLAN group have the same VLAN ID.

Another exemplary embodiment of the present disclosure provides a virtual local area network configuration method for a virtual local area network configuration system. The virtual local area network configuration system includes a plurality of virtual machines, a plurality of physical machines and a plurality of Ethernet switches. The Ethernet switches are connected to the physical machines through a plurality of links. The physical machines run a plurality of virtual machines. The virtual local area network configuration method includes deploying a plurality of VLAN groups according to locations of the physical machines and the virtual machines. Each VLAN group among the VLAN groups includes at least one physical machine among the physical machines and at least one virtual machine among the virtual machines. Moreover, the virtual local area network configuration method also includes creating a plurality of virtual topologies corresponding to the VLAN groups, and assigning a plurality of VLAN IDs separately to the VLAN groups. The virtual VLAN groups include one VLAN group and another VLAN group, and said one VLAN group and said another VLAN group have the same VLAN ID.

Another exemplary embodiment of the present disclosure provides a computer program product including at least one program command. The method described above can be completed after the program command is loaded and executed by an electronic device.

Based on the above, the virtual local area network configuration system, and the method and the computer program product thereof can be used to repeatedly assign the same VLAN ID to the different VLAN groups such that the number of the virtual local area networks deployable by the virtual local area network configuration system can be increased accordingly.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DETAILED DESCRIPTION

Figure 1:
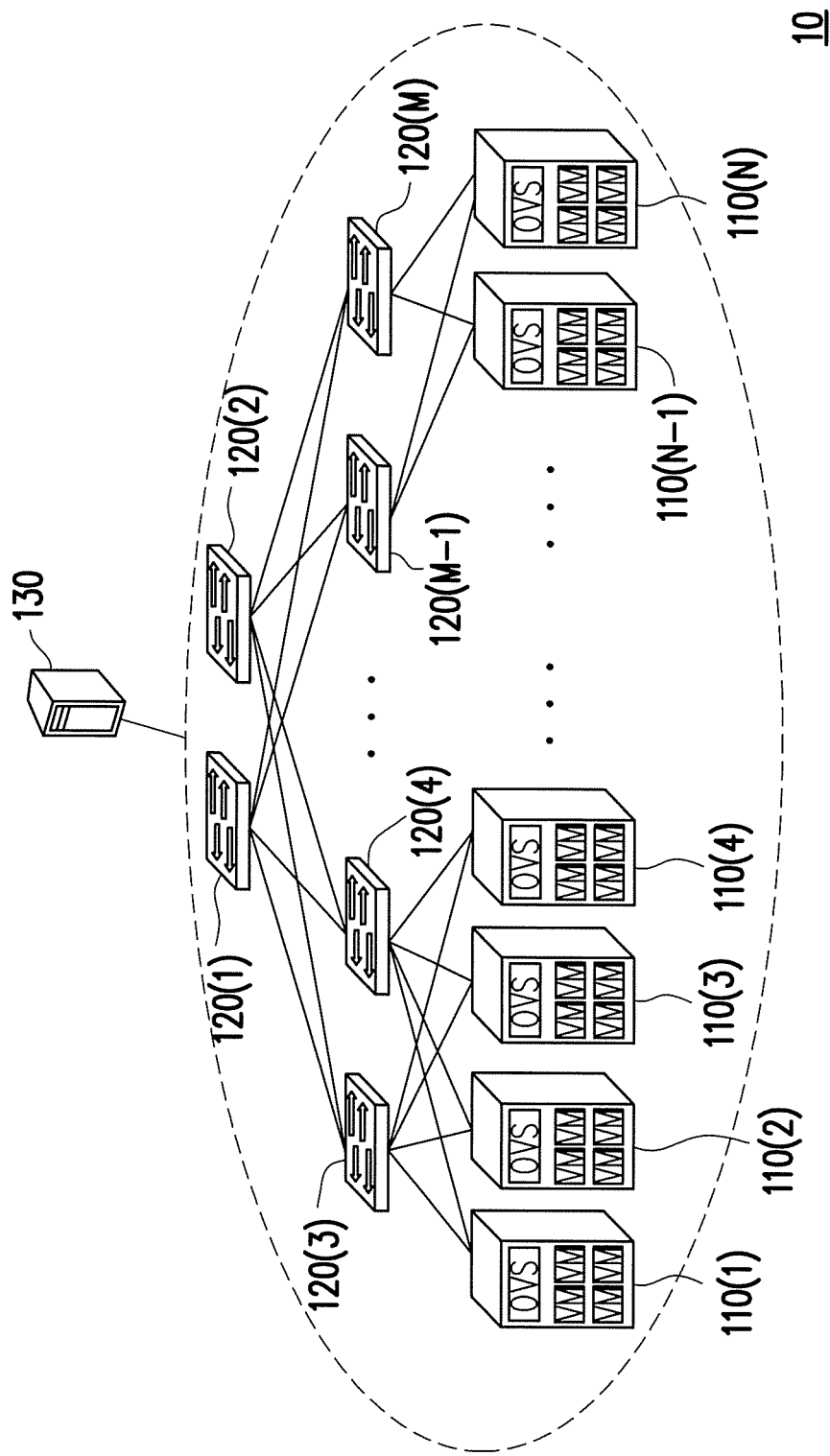
FIG. 1 is a schematic diagram illustrating a virtual local area network configuration system according to an exemplary embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram illustrating a virtual local area network configuration system according to an exemplary embodiment of the present disclosure.

With reference to FIG. 1, a virtual local area network configuration system 10 includes a plurality of physical machines 110(1) to 110(N), a plurality of Ethernet switches 120(1) to 120(M) and a network controller 130. For example, the virtual local area network configuration system 10 is a cloud computing and storage center.

In the present exemplary embodiment, each of the physical machines 110(1) to 110(N) can run one or more virtual machines VM, and the numbers of the virtual machines VM running on the physical machines 110(1) to 110(N) may be identical to or different. In another exemplary embodiment, each of the physical machines 110(1) to 110(N) further includes a corresponding virtual switch OVS (Open vSwitch) which allows the virtual machines VM running on the physical machines 110(1) to 110(N) to connect to the Ethernet switches 120(1) to 120(M) by using the virtual switches OVS. Here, the virtual switch OVS in each of the physical machines 110(1) to 110(N) can support the basic OpenFlow protocol. In general, the virtual switch OVS may be realized by an open source software "Open vSwitch". In this exemplary embodiment, in a network formed by the Ethernet switches 120(1) to 120(M) and the virtual switches OVS connected to each other, the Ethernet switches 120(1) to 120(M) are disposed at the core network and the virtual switches OVS are disposed at the network edge.

The Ethernet switches 120(1) to 120(M) have multiple ports so the Ethernet switches 120(1) to 120(M) can be connected, via the ports thereon, to the physical machines 110(1) to 110(N) (or the virtual switches OVS of the physical machines 110(1) to 110(N)). Taking the Ethernet switch 120(3) for example, the Ethernet switch 120(3) can be connected to the physical machines 110(1) to 110(N) via the ports. It is noted that, the present disclosure is not intended to limit the number of ports for the Ethernet switches 120(1) to 120(M), and thus the numbers of the physical machines connected by of the Ethernet switches 120(1) to 120(M) can be identical or different.

The network controller 130 is connected to the Ethernet switches 120(1) to 120(M) in the virtual local area network configuration system 10 and configured to manage all of the physical machines 110(1) to 110(N), the virtual machines VM, the Ethernet switches 120(1) to 120(M) and the virtual switches OVS in the virtual local area network configuration system 10. In the present exemplary embodiment, the network controller 130 is a network controller based on the SDN architecture. In the present exemplary embodiment, the network controller 130 can further include a database (not illustrated), which is configured to store management information related to the physical machines 110(1) to 110(N), the virtual machines VM, the Ethernet switches 120(1) to 120(M) and the virtual switches OVS. For instance, the management information include IP addresses of the physical machines 110(1) to 110(N), physical machine IDs of the physical machines 110(1) to 110(N), media access control addresses (MAC addresses) of the physical machines 110(1) to 110(N), IP addresses of the virtual machines VM, virtual machine IDs of the virtual machines VM, MAC addresses of the virtual machines VM, switch IDs of the Ethernet switches 120(1) to 120(M) and the virtual switches OVS, and MAC addresses of the Ethernet switches 120(1) to 120(M) and the virtual switches OVS. It is noted that, the network controller 130 may be an independent electronic device having hardware components such as a processing circuit, a memory, a network element (e.g., a network card)

and a hard drive, but the present disclosure is not limited to the above. For example, the network controller 130 may also be disposed in other electronic devices.

Based on routing requirements, the network controller 130 can update related settings (e.g., a static forwarding table) of the Ethernet switches 120(1) to 120(M) by transmitting multiple control signals to the Ethernet switches 120(1) to 120(M) (e.g., through Simple Network Management Protocol (SNMP) or Command Line Interface (CLI)). In addition, the network controller 130 can also transmit a match-action rule to the virtual switches OVS to control the virtual switches OVS to transmit packets to the corresponding ports.

In the present exemplary embodiment, the network controller 130 can decide which one of the physical machines will each virtual machine be deployed to according to actual requirements and available resources, and records a deployed location (e.g., the physical machine) for each virtual machine. Moreover, the network controller 130 can also deploy a plurality of VLAN groups according to the virtual machines VM and the physical machines 110(1) to 110(N). In other words, each of the VLAN groups can include at least one virtual machine (referred to a member virtual machine hereafter) and at least one physical machine (referred to a member physical machine hereafter). Further, the network controller 130 can create a virtual topology corresponding to each of the VLAN groups so the virtual machines in each VLAN group can communicate with each other through the corresponding virtual topology. Furthermore, the network controller 130 also assigns the VLAN ID to the each VLAN group. In particular, the network controller 130 maintains an available virtual topology for each of the VLAN IDs, and creates a virtual topology of the VLAN group according to the available virtual topology. Here, the available virtual topology described in the present disclosure includes at least one Ethernet switch, at least one physical machine and at least one link, and the at least one Ethernet switch and the at least one physical machine are connected to each other through the links therebetween.

Figure 2:
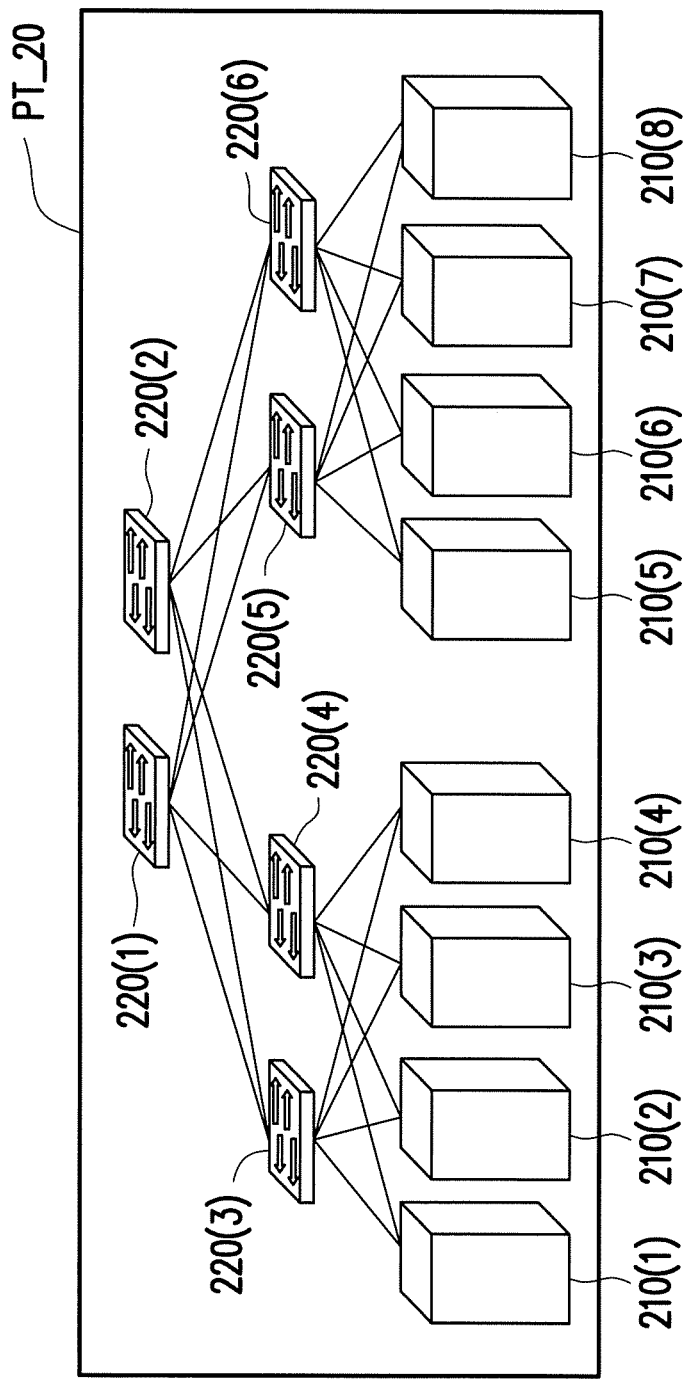
FIG. 2 is a schematic diagram illustrating a physical topology according to an exemplary embodiment of the present disclosure.

FIG. 2 is a schematic diagram illustrating a physical topology according to an exemplary embodiment of the present disclosure. To simplify the description, illustration of the network controller and the virtual machines in the virtual local area network configuration system are omitted in FIG. 2 and the subsequent exemplary embodiments.

With reference to FIG. 2, a virtual local area network configuration system 20 includes physical machines 210(1) to 210(8) and Ethernet switches 220(1) to 220(6). The physical machines 210(1) to 210(8), the Ethernet switches 220(1) to 220(6) and the links in between form a physical topology PT_20. In the physical topology PT_20, each of the Ethernet switch 220(1) and the Ethernet switch 220(2) is connected to the Ethernet switches 220(3) to 220(6). The Ethernet switch 220(3) and the Ethernet switch 220(4) are connected respectively to the physical machines 210(1) to 210(4). The Ethernet switch 220(5) and the Ethernet switch 220(6) are connected respectively to the physical machines 210(5) to 210(8).

Figure 3A:
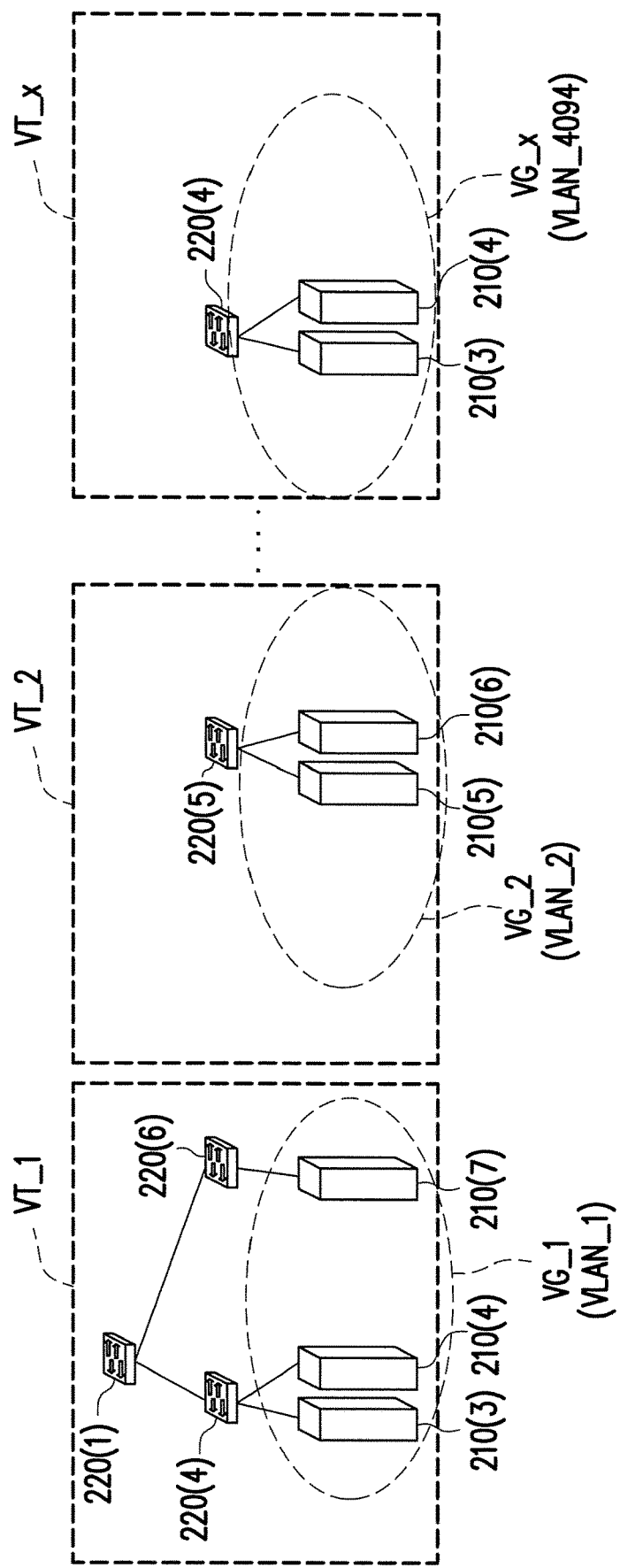
FIGS. 3A and 3B are schematic diagrams illustrating the virtual topology and the available virtual topology according to an exemplary embodiment of the exemplary embodiment of the present disclosure.
Figure 3B:
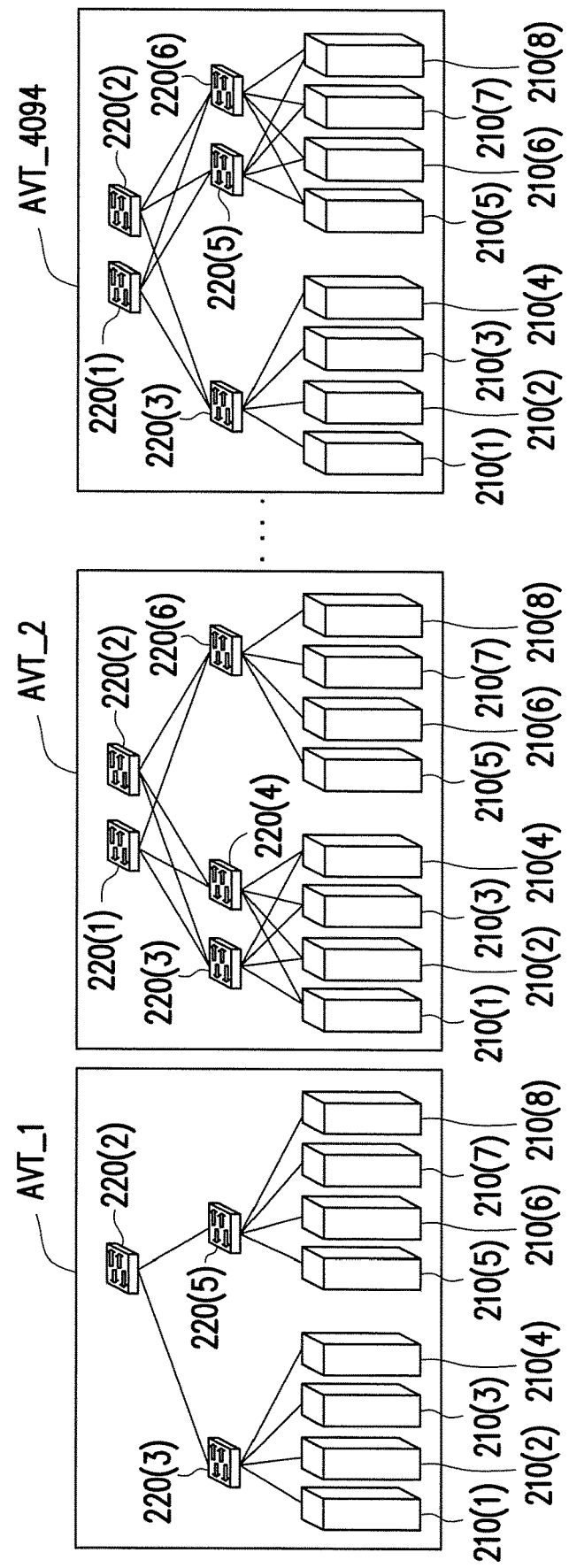

FIGS. 3A and 3B are schematic diagrams illustrating the virtual topology and the available virtual topology according to an exemplary embodiment of the exemplary embodiment of the present disclosure.

Referring to FIG. 2 and FIG. 3A, for example, the network controller 130 of the virtual local area network configuration system 20 deploys a VLAN group VG_1 in the physical topology PT_20. In the VLAN group VG_1, the member physical machines include the physical machine 210(3), the physical machine 210(4) and the physical machine 210(7), and the member virtual machines include a plurality of virtual machines (not illustrated) deployed in the physical machine 210(3), the physical machine 210(4) and the physical machine 210(7). In this example, the network controller 130 creates a virtual topology corresponding to the VLAN group VG_1 so the member physical machines and the member virtual machines in the VLAN group VG_1 can connect each other.

For example, when a VLAN ID VLAN_1 is not yet assigned to any VLAN group and the network controller 130 intends to assign the VLAN ID VLAN_1 to the VLAN group VG_1, the available virtual topology corresponding to the VLAN ID VLAN_1 is identical to the physical topology PT_20 in FIG. 2, and the network controller 130 creates a virtual topology VT_1 corresponding to the VLAN group VG_1 according to the available virtual topology corresponding to the VLAN ID VLAN_1 and assigns the VLAN ID VLAN_1 to the VLAN group VG_1. As shown in FIG. 3A, the created virtual topology VT_1 allows the member physical machines and the virtual machines in the VLAN group VG_1 to connect each other though the Ethernet switch 220(1), the Ethernet switch 220(4) and the Ethernet switch 220(6).

Then, the network controller 130 updates the available virtual topology corresponding to the VLAN ID VLAN_1 according to the created virtual topology VT_1. With reference to FIG. 3B, the network controller 130 updates the available virtual topology corresponding to the VLAN ID VLAN_1 by deleting the Ethernet switches already used in the virtual topology (VT) VT_1 in the original available virtual topology (which is identical to the physical topology PT_20). As shown in FIG. 3B, after the Ethernet switch 220(1), the Ethernet switch 220(4) and the Ethernet switch 220(6) already used in the virtual topology VT_1 are deleted, the available virtual topology corresponding to the VLAN ID VLAN_1 is updated into an available virtual topology (AVT) AVT_1. The available virtual topology AVT_1 can only connect the physical machines 210(1) to 210(8) together through the Ethernet switch 220(2), the Ethernet switch 220(3) and the Ethernet switch 220(5). Furthermore, the network controller 130 records the updated available virtual topology AVT_1. Subsequently, when intending to assign the VLAN ID VLAN_1 to another VLAN group again, the network controller 130 can create the virtual topology of the another VLAN group according to the recorded available virtual topology AVT_1. By analogy, the network controller 130 may update the available virtual topologies corresponding to each of the VLAN IDs by aforesaid method. In other words, each time when the virtual topology is to be created, the network controller 130 can select the VLAN ID to be assigned to the VLAN group, and create the virtual topology of such VLAN group according to the available virtual topology corresponding to such VLAN group. In this way, the VLAN ID may be repeatedly assigned to different VLAN groups.

It is noted that, the network controller 130 of the preset disclosure may configure the virtual topologies of the VLAN groups in batch. Under such circumstance, the network controller 130 may sort the VLAN groups according to a number of the member physical machines in each VLAN group among these VLAN groups. For example, these VLAN groups may be sorted in decreasing order according to the numbers of the member physical machines. Then, the network controller 130 may select each of the VLAN groups in sequence to create the corresponding virtual topologies. Taking the VLAN group VG_1 and a VLAN group VG_2 in FIG. 3A for example, the number of the member physical machines (i.e., the physical machine 210(3), the physical machine 210(4) and the physical machine 210(7)) in the VLAN group VG_1 is 3, and the number of the member physical machines (i.e., the physical machine 210(5) and the physical machine 210(6)) in the VLAN group VG_2 is 2. Therefore, the network controller 130 first selects the VLAN group VG_1 to create the corresponding virtual topology VT_1 and then selects the VLAN group VG_2 to create the corresponding virtual topology VT_2. Nonetheless, the network controller 130 may also sort the VLAN groups in increasing order according to the numbers of the member physical machines, and the order for selecting the VLAN groups is not particularly limited by the present disclosure.

In addition, the network controller 130 may also decide the VLAN ID to be assigned to the VLAN groups according to a size of each available virtual topology corresponding to the VLAN ID. For example, when one VLAN ID is already assigned to at least one VLAN group, the available virtual topology corresponding to such VLAN ID includes only the Ethernet switch not yet used in the virtual topology of said at least one VLAN group. Here, the size of the available virtual topology refers to the number of Ethernet switches in the available virtual topology. Based on that, the network controller 130 may first sort the VLAN IDs according to the sizes of the available virtual topologies corresponding to the VLAN IDs. For example, the network controller 130 sorts the VLAN IDs in increasing order according to the sizes of the available virtual topologies. Then, the network controller 130 may select the VLAN ID to be assigned to the VLAN group according to the sorted result. Taking the available virtual topology AVT_1 and the available virtual topology AVT_2 in FIG. 3B for example, the size of the available virtual topology AVT_1 corresponding to the VLAN ID VLAN_1 is 3, and the size of the available virtual topology AVT_2 corresponding to the VLAN ID VLAN_2 is 5. Therefore, the network controller 130 first selects the VLAN ID VLAN_1 as the VLAN ID to be assigned to the VLAN group. Nonetheless, the network controller may also sort the VLAN IDs in decreasing order according to the sizes of the available virtual topologies, and the order for selecting the VLAN IDs is not particularly limited by the present disclosure.

In the following exemplary embodiments of FIGS. 4A to 4C and FIGS. 5A and 5B, it is assumed that the network controller already deploys a first VLAN group and intends to assign a first VLAN ID to the first VLAN group. In such case, the network controller may find a first available virtual topology corresponding to the first VLAN ID. Then, the network controller creates a first virtual topology corresponding to the first VLAN group according to the first available virtual topology.

Figure 4A:
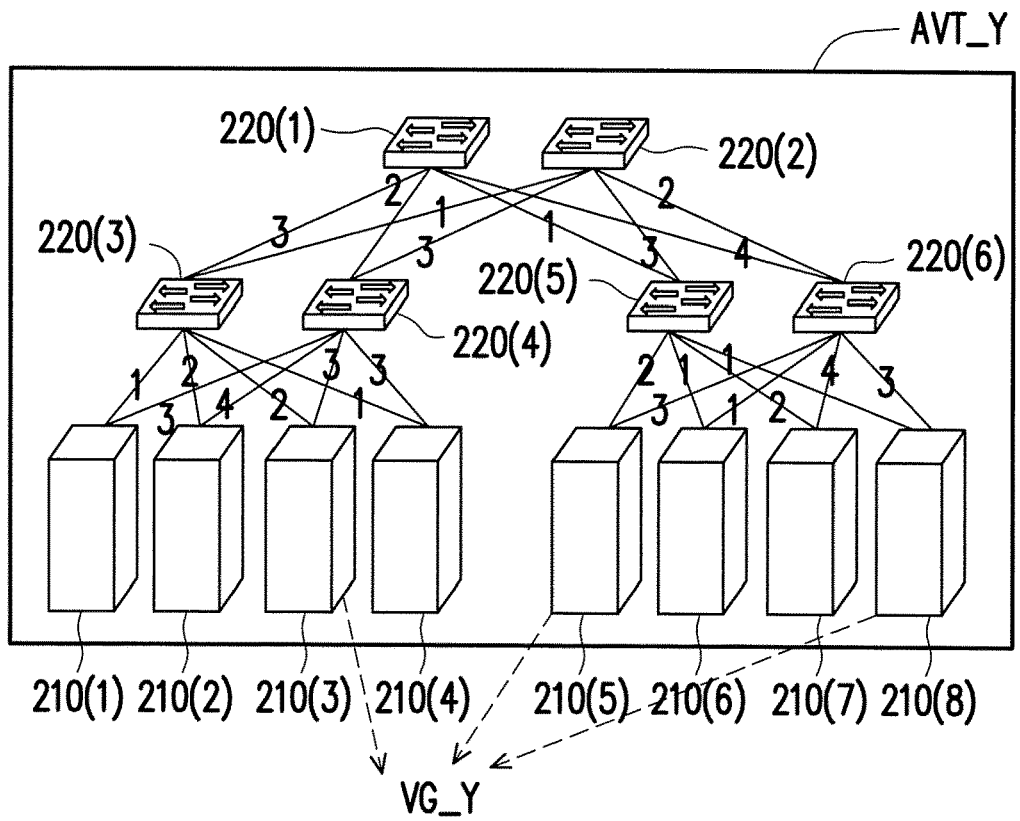
FIGS. 4A to 4C illustrate schematic diagrams for creating the virtual topology according to an exemplary embodiment of the present disclosure.
Figure 4B:
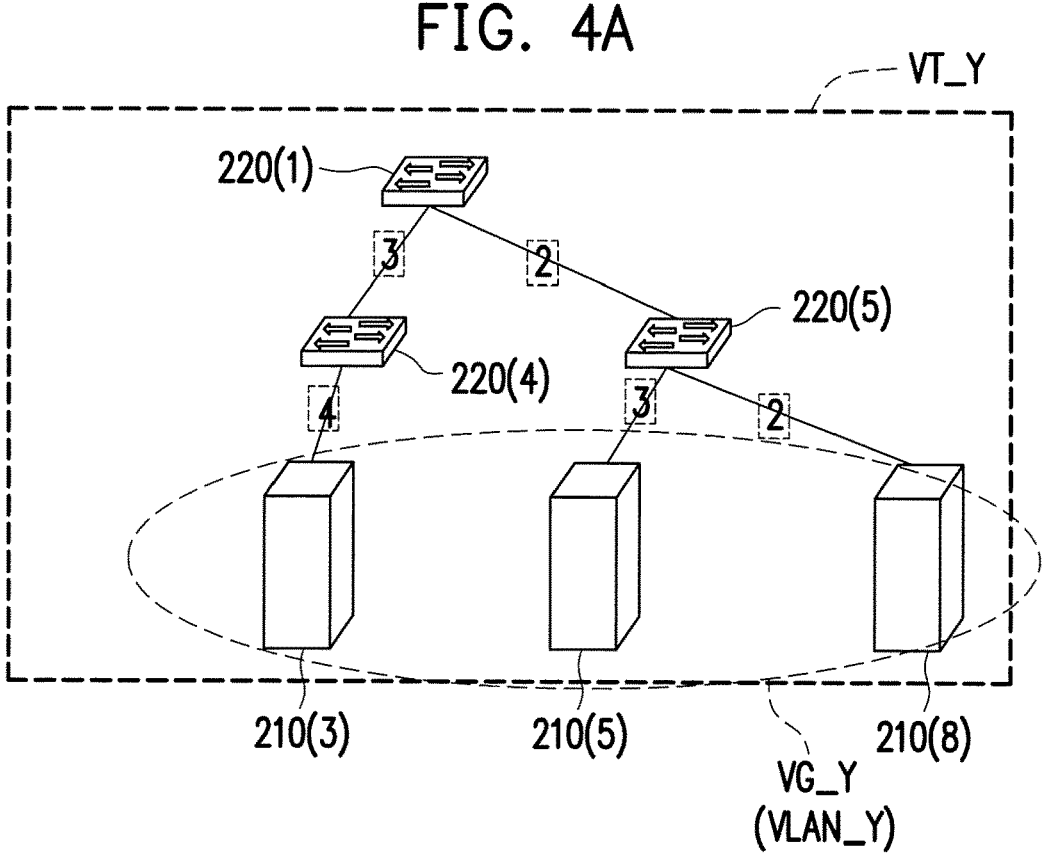
Figure 4C:
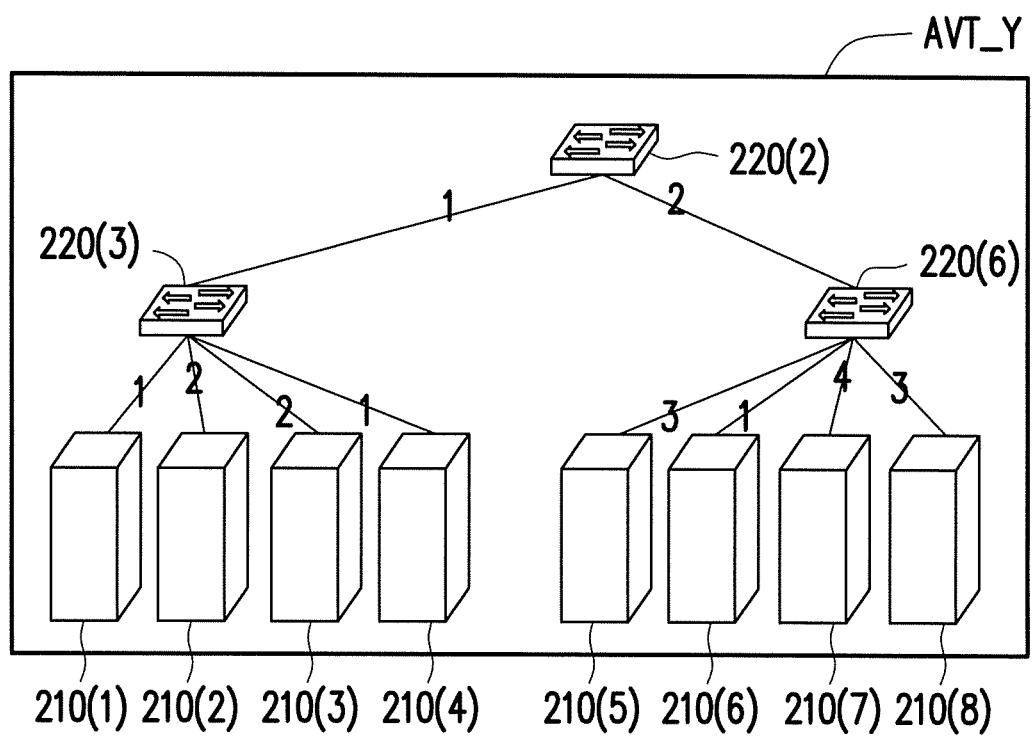

FIGS. 4A to 4C illustrate schematic diagrams for creating the virtual topology according to an exemplary embodiment of the present disclosure.

In the exemplary embodiments of FIGS. 4A to 4C, it is assumed that the network controller 130 already deploys a first VLAN group (i.e., a VLAN group VG_Y) and intends to assign a first VLAN ID (i.e., a VLAN ID VLAN_Y) to the first VLAN group. Based on that, the network controller 130 finds a first available virtual topology (i.e., an available virtual topology AVT_Y) corresponding to the first VLAN ID so as to create a first virtual topology corresponding to the first VLAN group according to the first available virtual topology.

Referring to FIG. 2 and FIG. 4A together, the member physical machines of the VLAN group VG_Y include the physical machine 210(3), the physical machine 210(5) and the physical machine 210(8). The method used by the network controller 130 for deciding the VLAN ID to be assigned is already described in the foregoing exemplary embodiment, which is not repeated hereinafter. Specifically, the network controller 130 finds the available virtual topology AVT_Y corresponding to the VLAN ID VLAN_Y from recorded data. As shown in FIG. 4A, the physical machines 210(1) to 210(8), the Ethernet switches 220(1) to 220(6) and the links form the available virtual topology AVT_Y. For example, the Ethernet switch 220(3) is connected to the physical machines 210(1) to 210(4) through four links.

In the present exemplary embodiment, the network controller 130 also records one weighted value for each link. The weighted value of the link may be recorded in the network controller or the database of the other electronic device. Specifically, the network controller 130 calculates a VLAN group count for each link, and sets the weighted values of the links as the VLAN group counts of the links. Herein, the VLAN group count of the link represents the number of the VLAN groups using such link. In other words, the weighted value of the link represents the number of virtual local area networks (or the virtual topologies) using the link. In the present exemplary embodiment, each of the VLAN groups using the same link is assigned with different VLAN IDs. For example, as shown in FIG. 4A, the weighted value of the link connecting the Ethernet switch 220(5) and the physical machine 210(5) is 2, which represents that there are already two VLAN groups (or the virtual topologies) using such link.

In the present exemplary embodiment, for example, the network controller 130 creates the virtual topology VT_Y of the VLAN group VG_Y by using a Breath-First-Search (BFS) algorithm according to the weighted values of the links. Specifically, the network controller uses the BFS algorithm to search for the member physical machines of the VLAN group VG_Y in the available virtual topology AVT_Y, and decides a visiting order for the nodes according to the weighted values of the links. In the present exemplary embodiment, the network controller 130 decides one root node from among the member physical machine of the VLAN group. For example, the network controller 130 selects the member physical machine having the most member virtual machines in the VLAN group VG_Y as the root node. Next, starting from the root node, the network controller 130 sequentially visits nodes connected by the available virtual topology AVT_Y in increasing order according to the weighted values of the links. Further, the network controller 130 determines whether the visited node is the member physical machine of the VLAN group VG_Y. If the visited node is the member physical machine of the VLAN group VG_Y, the network controller 130 creates the virtual topology VT_Y of the VLAN group VG_Y according to a path through which the node is visited.

For instance, as shown in FIG. 4A, it is assumed that the network controller 130 decides to use the physical machine 210(5) as the root node. According to the available virtual topology AVT_Y, the two links connecting the physical machine 210(5) are the link between the physical machine 210(5) and the Ethernet switch 220(5) (with the weighted value being 2) and the link between the physical machine 210(5) and the Ethernet switch 220(6) (with the weighted value being 3). According to the weighted values of said two links, the network controller 130 preferentially visits the Ethernet switch 220(5) first before visiting the Ethernet switch 220(6). Next, because none of the Ethernet switch 220(5) and the Ethernet switch 220(6) is determined as the member physical machine of the VLAN group VG_Y, the network controller 130 continues to visit the nodes connected to the Ethernet switch 220(5). Similarly, the network controller 130 decides the visiting order according to the weighted values of the links connecting the Ethernet switch 220(5). For example, the network controller 130 preferentially visits the nodes connected by the link with the weighted value being 1 (i.e., the physical machine 210(6), the physical machine 210(8) and the Ethernet switch 220(1)). Next, the network controller 130 determines that the physical machine 210(8) is the member physical machine of the VLAN group VG_Y. Accordingly, the network controller 130 records a path for reaching the physical machine 210(8) via the Ethernet switch 220(5) from the physical machine 210(5) as the reference for creating the virtual topology VT_Y.

By analogy, the network controller 130 sequentially visits the physical machine 210(7) and the Ethernet switch 220(2) and determines that none of the two is the member physical machine of the VLAN group VG_Y. At this time, the nodes connected by the Ethernet switch 220(5) are all visited, however, not all of the member physical machines of the VLAN group VG_Y are found. Therefore, the network controller 130 continues to visit the nodes connected by the Ethernet switch 220(6) and determines that all those nodes are already visited. Next, the network controller 130 preferentially chooses to visit the nodes connected by the Ethernet switch 220(1) according to the visiting order. The network controller 130 sequentially visits the Ethernet switch 220(4) and the Ethernet switch 220(3) connected by the Ethernet switch 220(1), and determines that none of the two is the member physical machine of the VLAN group VG_Y. The network controller 130 then continues to visit the nodes connected by the Ethernet switch 220(4). The network controller 130 preferentially visits the nodes connected by the link with the weighted value being 3 (i.e., the physical machine 210(1), the physical machine 210(3) and the physical machine 210(4)). In the present exemplary embodiment, the network controller 130 first visits the physical machine 210(4) and determines that the physical machine 210(4) is not the member physical machine of the VLAN group VG_Y. Next, the network controller 130 continues to visit the physical machine 210(3) and discovers that the physical machine 210(3) is the member physical machine of the VLAN group VG_Y. Accordingly, the network controller 130 records the path for reaching the physical machine 210(3) via the Ethernet switch 220(5), the Ethernet switch 220(1) and the Ethernet switch 220(4) from the physical machine 210(5) as the reference for creating the virtual topology VT_Y. At this time, the network controller 130 determines that all of the member physical machines of the VLAN group VG_T (i.e., the physical machine 210(3), the physical machine 210(5) and the physical machine 210(8)) are found, and thus the network controller 130 stops searching. It should be noted, although the BFS algorithm is used as a searching method in the above example, the present disclosure is not limited thereto. In another exemplary embodiment, other suitable searching mechanisms may also be adopted.

Referring to FIG. 4B, the network controller 130 creates the virtual topology VT_Y of the VLAN group VG_Y according to the recorded paths, and assigns the VLAN ID VLAN_Y to the VLAN group VG_Y. In addition, the network controller 130 updates the weighted values of the links used by the VLAN group VG_Y (or the virtual topology VT_Y). In the present exemplary embodiment, the network controller 130 adds one to each of the weighted values of the links used by the VLAN group VG_Y (or the virtual topology VT_Y), and records the updated weighted values.

With reference to FIG. 4C, the network controller 130 further updates the available virtual topology AVT_Y corresponding to the VLAN ID VLAN_Y according to the created virtual topology VT_Y. The method for updating the available virtual topology is already described in the foregoing exemplary embodiment, which is not repeated hereinafter.

As mentioned in the foregoing exemplary embodiment, the network controller 130 may sort the VLAN IDs according to the sizes of the corresponding available virtual topologies, so as to select the VLAN ID to be assigned according to the sorted result and create the virtual topology of the VLAN group by the corresponding available virtual topology. When the virtual topology of the VLAN group is not creatable according to the available virtual topology corresponding to the selected VLAN ID, the network controller 130 selects the next VLAN ID according to the sorted result so as to create the virtual topology of the VLAN group. Also, when the virtual topology of the VLAN group is not creatable according to the available virtual topologies corresponding to the VLAN IDs, the network controller 130 resettles the virtual machines in the VLAN group.

Figure 5A:
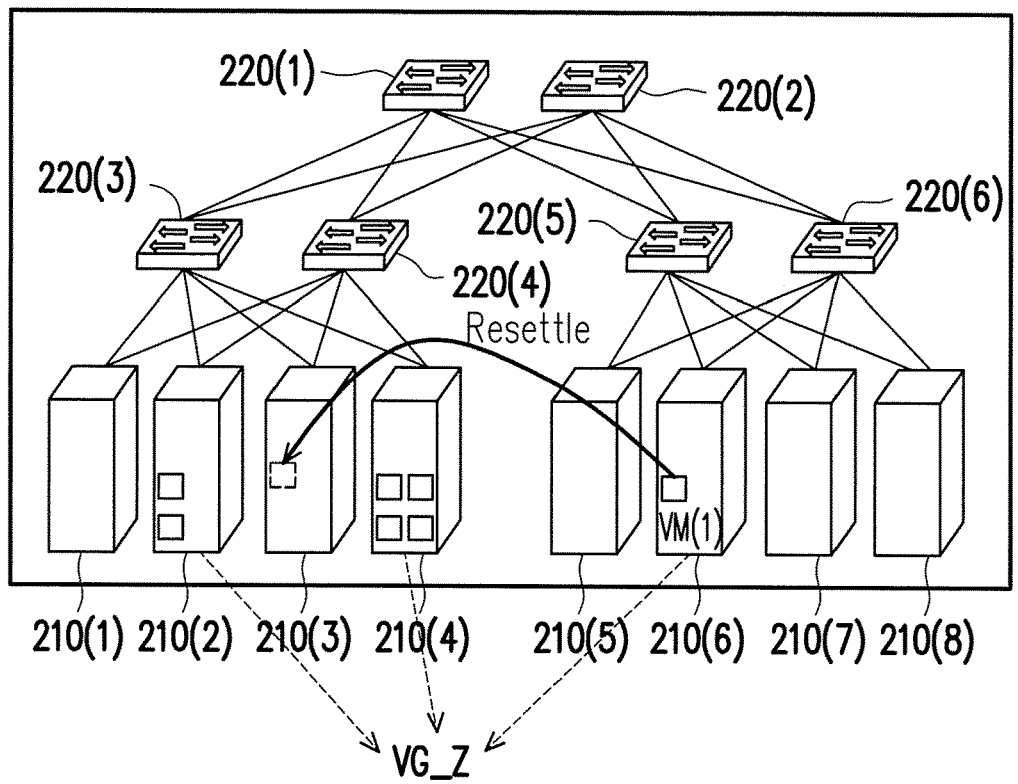
FIGS. 5A and 5B illustrate schematic diagrams for resettling the virtual topology according to an exemplary embodiment of the present disclosure.
Figure 5B:
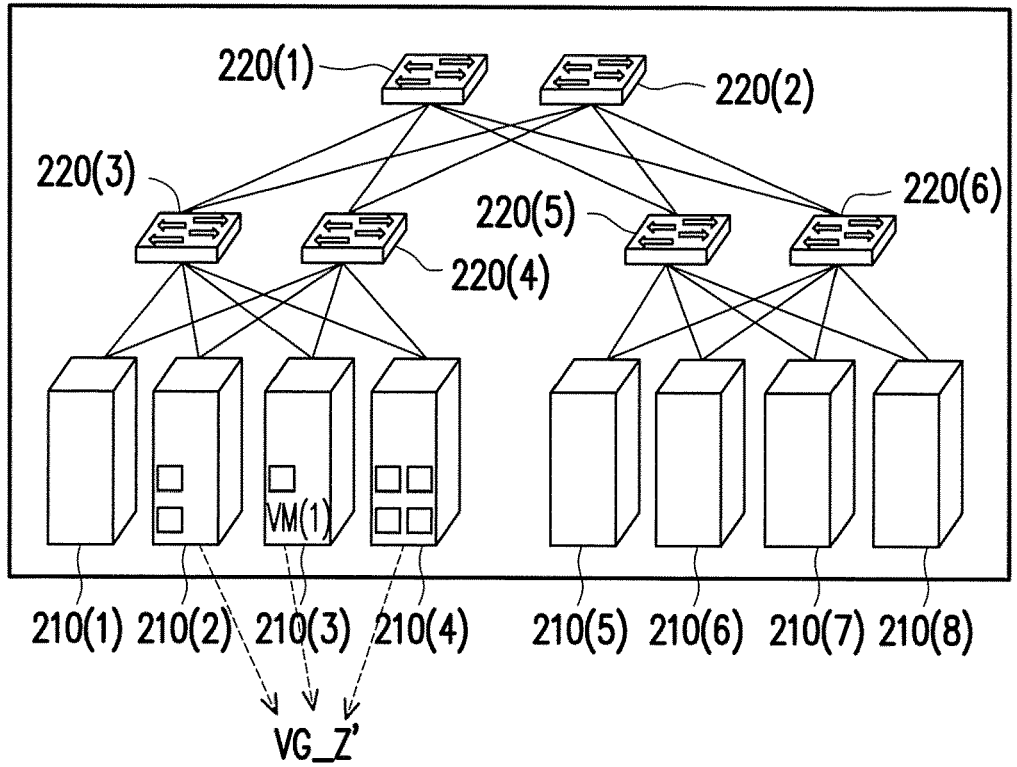

FIGS. 5A and 5B illustrate schematic diagrams for resettling the virtual topology according to an exemplary embodiment of the present disclosure.

Referring to FIG. 2 and FIG. 5A together, the virtual local area network configuration system 20 corresponds to the physical topology PT_20. The member physical machines of a VLAN group VG_Z include the physical machine 210(2), the physical machine 210(4) and the physical machine 210(6). In the present exemplary embodiment, it is assumed that the network controller 130 is unable to create the virtual topology of the first VLAN group (i.e., the VLAN group VG_Z) according to the available virtual topologies of the VLAN IDs. Based on that, the network controller 130 determines whether any member virtual machine is running independently on any member physical machines among the member virtual machines of the VLAN group VG_Z. For example, a virtual machine VM(1) (referred to a first virtual machine hereafter) is the member virtual machine running independently on the physical machine 210(6) (referred to a first physical machine hereafter). Next, the network controller 130 resettles the virtual machine VM(1) in another physical machine different from the physical machine 210(6). In the present exemplary embodiment, the network controller 130 selects the physical machine closer to the at least one other the member physical machine for resettling the virtual machine VM(1). Specifically, the network controller 130 may select the physical machine for resettling the virtual machine VM(1) according to a length of a shortest path connecting two physical machines in the physical topology PT_20. For example, a shortest path between the physical machine 210(6) and the physical machine 210(2) (referred to a third physical machine hereafter) is four links. A shortest path between the physical machine 210(3) (referred to a second physical machine hereafter) and the physical machine 210(2) is two links, and a shortest path between the physical machine 210(3) and the physical machine 210(4) is two links. The network controller 130 may then determine that the shortest path between the physical machine 210(3) and the physical machine 210(2) is less than the shortest path between the physical machine 210(6) and the physical machine 210(2). Accordingly, the network controller 130 determines that the physical machine 210(3) is the physical machine closer to the other member physical machine, and then resettles the virtual machine VM(1) in the physical machine 210(3).

With reference to FIG. 5B, after resettling the virtual machine VM(1) in the physical machine 210(3), the network controller 130 updates the VLAN group VG_Z into a VLAN group VG_Z'. The member physical machines of the VLAN group VG_Z' include the physical machine 210(2), the physical machine 210(3) and the physical machine 210(4). Then, the network controller 130 creates a virtual topology corresponding to the VLAN group VG_Z' according to the method for creating the virtual topology as described above.

In the present exemplary embodiment, if the virtual machine is to be added to one of the existing VLAN groups, the network controller 130 preferentially deploys the virtual machine to be added in the member physical machine of such VLAN group. However, as a matter of fact, it is possible that the virtual machine cannot be added in the member physical machine due to insufficient resource, etc. When the virtual machine to be added is not deployable in any member physical machine of such VLAN group, the network controller 130 deploys the virtual machine to be added in one specific physical machine other than the member physical machines of such VLAN group, and then sets that specific physical machine as the member physical machine of such VLAN group.

Figure 6A:
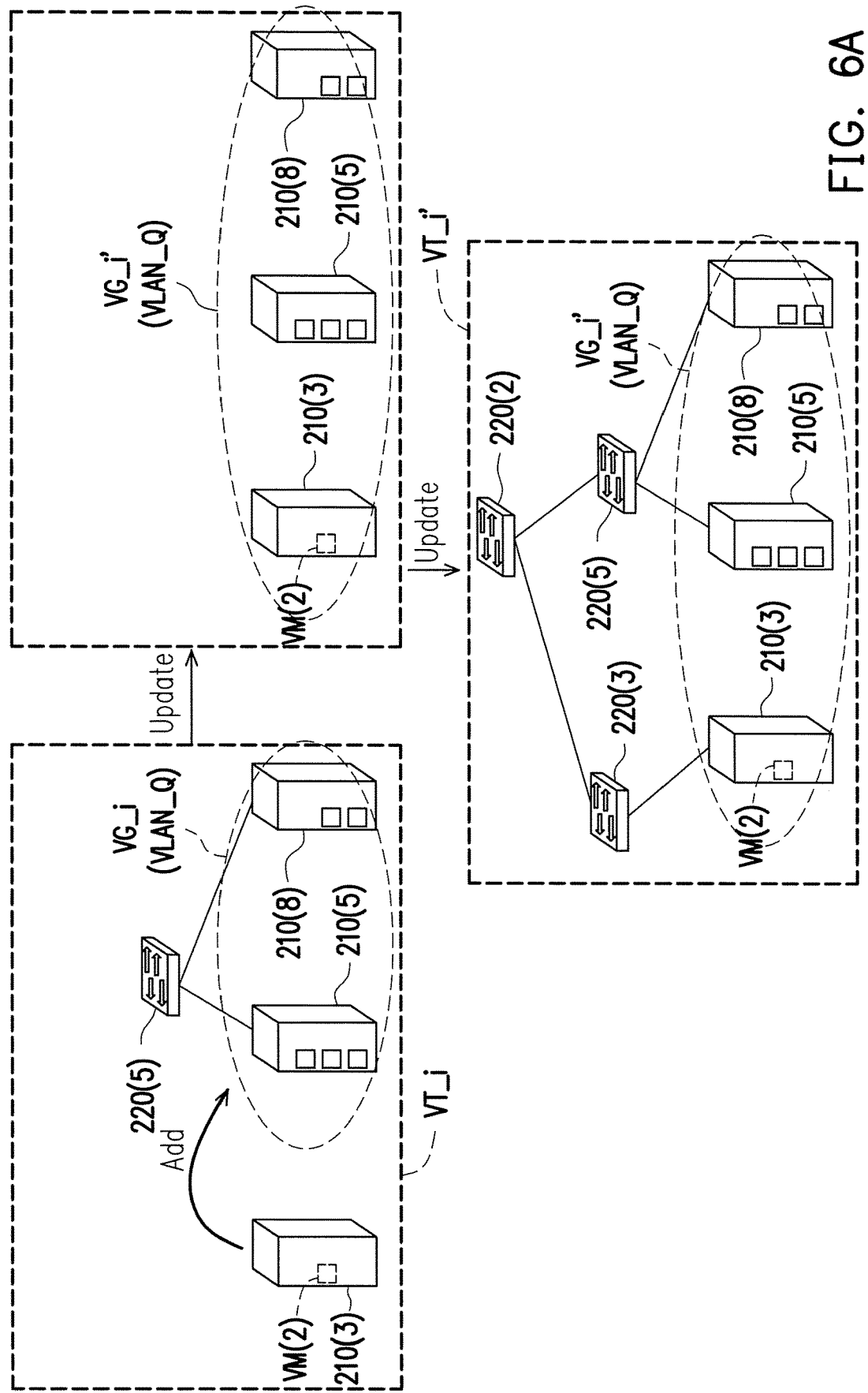
FIGS. 6A and 6B illustrate schematic diagrams for adding the virtual machine in the virtual local area network according to an exemplary embodiment of the present disclosure.
Figure 6B:
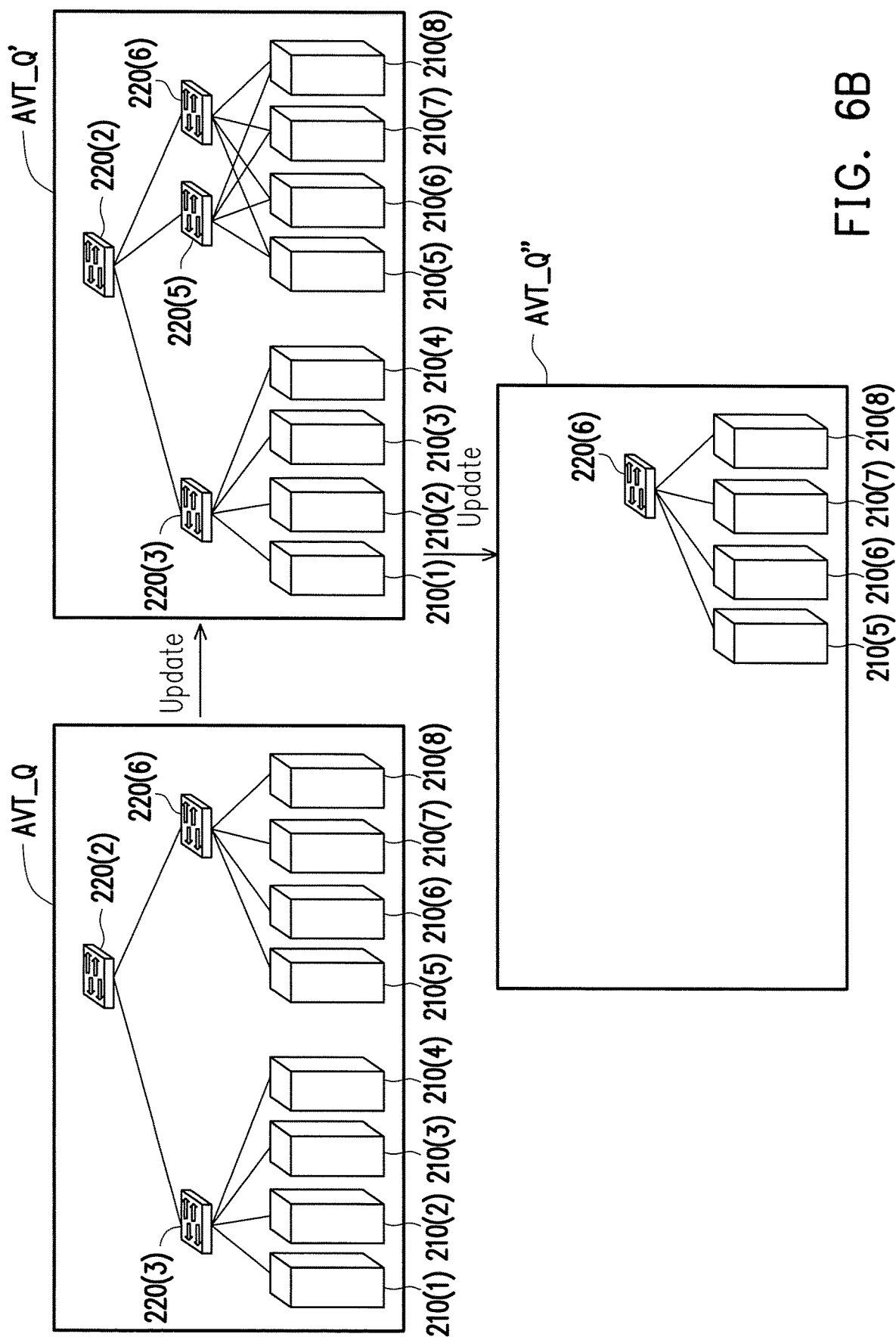

FIGS. 6A and 6B illustrate schematic diagrams for adding the virtual machine in the virtual local area network according to an exemplary embodiment of the present disclosure.

Referring to FIG. 2 and FIGS. 6A and 6B together, the member physical machines of a VLAN group VG_i (referred to a second VLAN group hereafter) include the physical machine 210(5) and the physical machine 210(8). A virtual topology VT_i (referred to a second available virtual topology hereafter) of the VLAN group VG_i connects the physical machine 210(5) and the physical machine 210(8) together through the Ethernet switch 220(5). The VLAN group VG_i is assigned with a VLAN ID VLAN_Q, and an available virtual topology AVT_Q corresponding to the VLAN ID VLAN_Q connects the physical machines 210(1) to 210(8) together through the Ethernet switch 220(2), the Ethernet switch 220(3) and the Ethernet switch 220(6). In the present exemplary embodiment, it is assumed that the network controller 130 intends to add a virtual machine VM(2) (referring to a second virtual machine below) in the VLAN group VG_i, but the virtual machine VM(2) is not deployable using the existing member physical machines (i.e., the physical machine 210(5) and the physical machine 210(8)). Based on that, the network controller 130 deploys the virtual machine VM(2) in the physical machine 210(3) (referred to a fourth physical machine hereafter), and updates the VLAN group VG_i into a VLAN group VG_i'. Accordingly, the member physical machines of the VLAN group VG_i' include the physical machine 210(3), the physical machine 210(5) and the physical machine 210(8). The fourth physical machine may be any physical machine having sufficient resource for adding the virtual machine, and the method for selecting the fourth physical machine is not particularly limited by the present disclosure.

Then, the network controller 130 again creates a virtual topology of the VLAN group VG_i'. Specifically, the network controller first updates the available virtual topology AVT_Q corresponding to the VLAN ID VLAN_Q. In the present exemplary embodiment, the network controller 130 updates the available virtual topology AVT_Q corresponding to the VLAN ID VLAN_Q by adding the virtual topology VT_i to the available virtual topology AVT_Q. As shown in FIG. 6B, the available virtual topology AVT_Q is updated into an available virtual topology AVT_Q'. The network controller may again create a virtual topology VT_i' of the VLAN group VG_i' according to the available virtual topology AVT_Q'. As shown in FIG. 6A, the virtual topology VT_i' of the VLAN group VG_i' may connect all of the member physical machines (i.e., the physical machine 210 (3), the physical machine 210(5) and the physical machine 210(8)) through the Ethernet switch 220(2), the Ethernet switch 220(3) and the Ethernet switch 220(5). As shown in FIG. 6B, the network controller 130 again updates the available virtual topology AVT_Q' corresponding to the VLAN ID VLAN_Q into an available virtual topology AVT_Q" according to the created virtual topology VT_i'. In the above description, the method for creating the virtual topology and the method for updating the available virtual topology are already described in the foregoing exemplary embodiment, which is not repeated hereinafter.

It is noted that, when the network controller is unable to create the virtual topology of the VLAN group VG_i' according to the available virtual topology AVT_Q' corresponding to the VLAN ID VLAN_Q, the network controller 130 selects an available virtual topology corresponding to another VLAN ID to create the virtual topology of the VLAN group VG_i'.

Figure 7A:
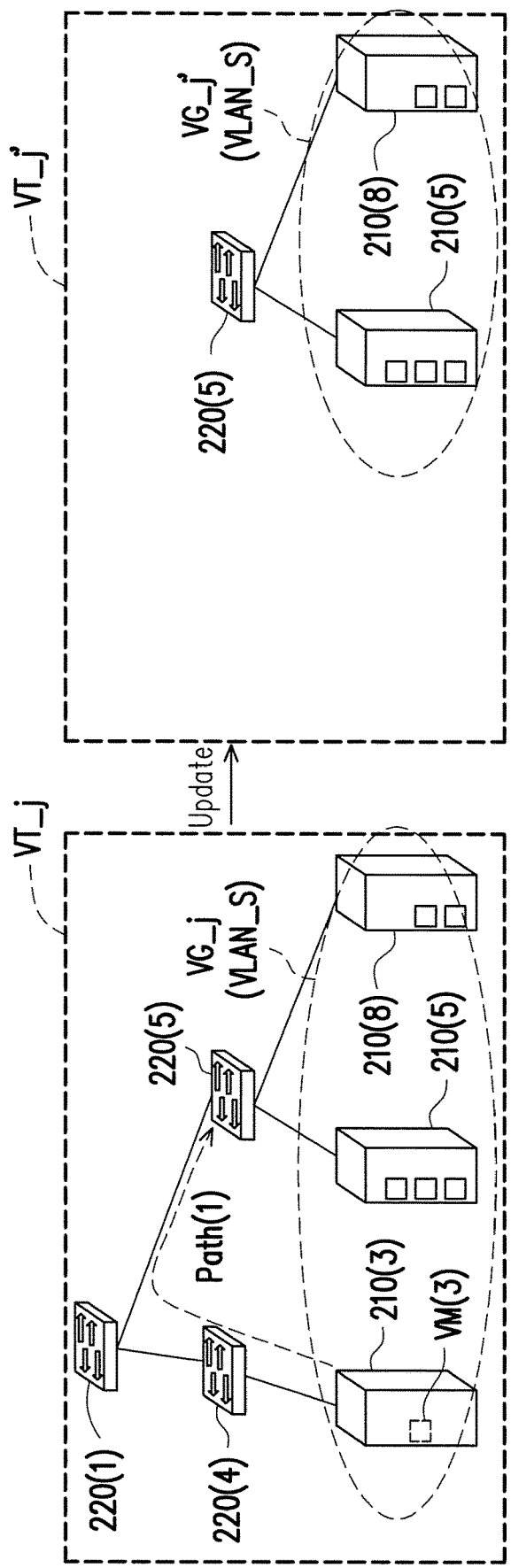
FIGS. 7A and 7B illustrate schematic diagrams for updating the virtual topology when the virtual machine is removed according to an exemplary embodiment of the exemplary embodiment of the present disclosure.
Figure 7B:
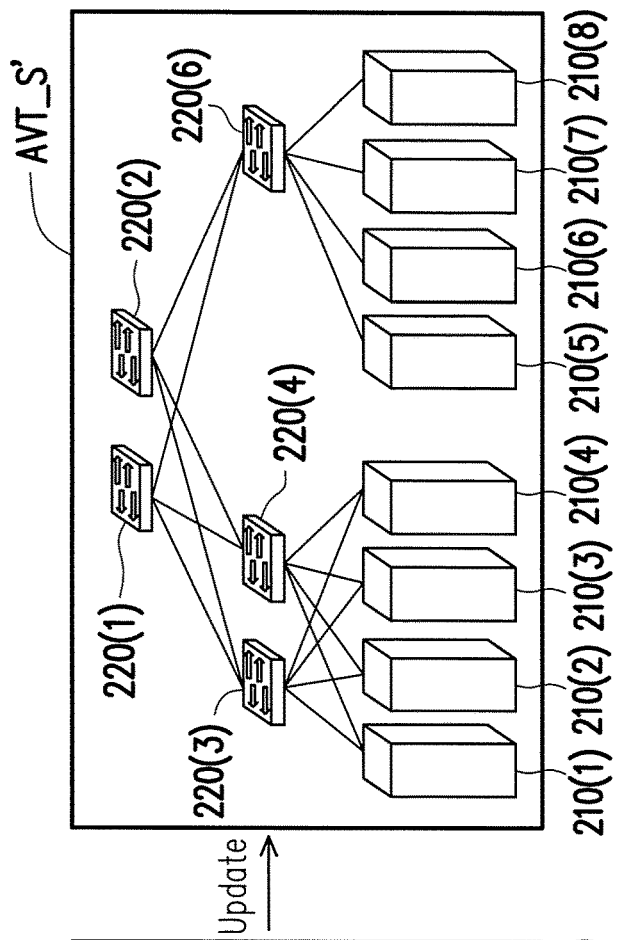
Figure 7B:
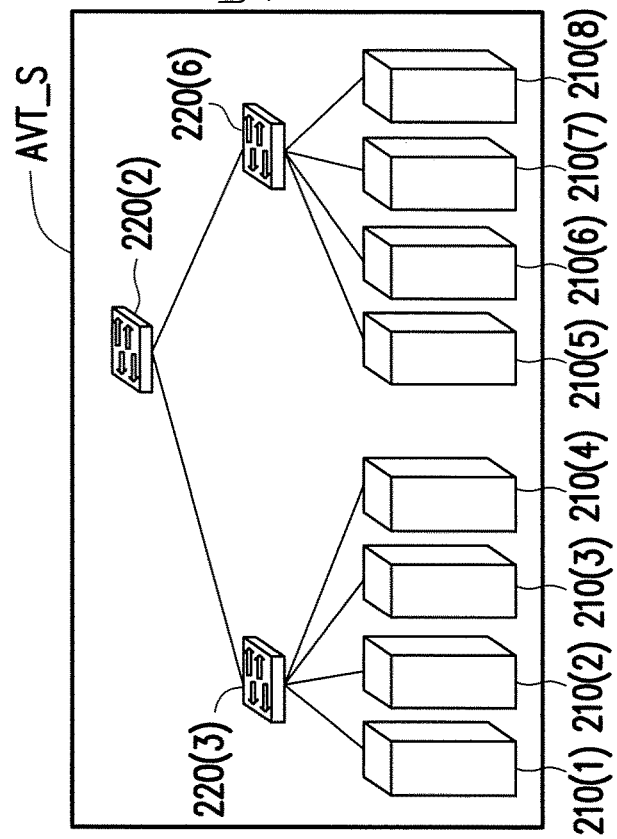

FIGS. 7A and 7B illustrate schematic diagrams for updating the virtual topology when the virtual machine is removed according to an exemplary embodiment of the exemplary embodiment of the present disclosure.

Referring to FIG. 2 and FIGS. 7A and 7B together, the member physical machines of a VLAN group VG_j (referred to a third VLAN group hereafter) include the physical machine 210(3), the physical machine 210(5) and the physical machine 210(8). A virtual topology VT_j (referred to a third virtual topology hereafter) of the VLAN group VG_j connects all of the member physical machines (i.e., the physical machine 210(3), the physical machine 210(5) and the physical machine 210(8)) through the Ethernet switch 220(1), the Ethernet switch 220(4) and the Ethernet switch 220(5). The VLAN group VG_j is assigned with a VLAN ID VLAN_S, and an available virtual topology AVT_S corresponding to the VLAN ID VLAN_S connects the physical machines 210(1) to 210(8) together through the Ethernet switch 220(2), the Ethernet switch 220(3) and the Ethernet switch 220(6).

In the present exemplary embodiment, it is assumed that the network controller intends to remove a virtual machine VM(3) (referred to a to-be-removed virtual machine hereafter) deployed on the physical machine 210(3) (referred to a fifth physical machine hereafter). The network controller first determines whether the virtual machine VM(3) is the member virtual machine running independently on the physical machine 210(3) in the VLAN group VG_j. If the virtual machine VM(3) is not the member virtual machine running independently on the physical machine 210(3), the network controller 130 removes the virtual machine VM(3) from a member virtual machine list of the VLAN group VG_j, and determines whether it is required to update settings (e.g., settings for the packet forwarding rule) in the virtual switch based on actual requirements. On the other hand, if the virtual machine VM(3) is the member virtual machine running independently on the physical machine 210(3), the network controller 130 uses the physical machine 210(3) as the root node to unidirectionally search for a node having a branch path according to the virtual topology VT_j. For example, starting from the physical machine 210(3), the network controller 130 first visits the Ethernet switch 220(4) following a path Path(1) in the virtual topology VT_j. Because the Ethernet switch 220(4) is not the node having the branch path (i.e., which is only connected to the Ethernet switch 220(1)), the network controller 130 continues to visit the Ethernet switch 220(1) following the path Path(1). Because the Ethernet switch 220(1) is not the node having the branch path (i.e., which is only connected to the Ethernet switch 220(5)) either, the network controller 130 continues to visit the Ethernet switch 220(5) following the path Path(1). At this time, the network controller 130 determines that the Ethernet switch 220(5) (referred to a first Ethernet switch hereafter) is the node having the branch path (i.e., connected to the physical machine 210(5) and the physical machine 210(8)) and stops searching.

Then, the network controller 130 updates the available virtual topology corresponding to the VLAN ID VLAN_S according to the path Path(1) between the physical machine 210(3) and the Ethernet switch 220(5). As shown in FIG. 7B, the network controller 130 adds the Ethernet switch 220(1) and the Ethernet switch 220(4) not having the branch path on the path Path(1) to the available virtual topology AVT_S. Therefore, the available virtual topology AVT_S is updated into an available virtual topology AVT_S'. In addition, the network controller 130 removes the physical machine 210(3) and the virtual machine VM(3) from the VLAN group VG_j. As shown in FIG. 7A, the VLAN group VG_j is updated into a VLAN group VG_j'. Also, the network controller 130 removes the path Path(1) from the virtual topology VT_j (i.e., removing the Ethernet switch 220(1), the Ethernet switch 220(4) and related links). Therefore, the virtual topology VT_j is updated into a virtual topology VT_j'. In the present exemplary embodiment, the network controller 130 also updates the weighted values of the related links on the path Path(1). For example, each of the weighted value of the link between the physical machine 210(3) and the Ethernet switch 220(4), the weighted value of the link between the Ethernet switch 220(4) and the Ethernet switch 220(1) and the weighted value of the link between the Ethernet switch 220(1) and the Ethernet switch 220(5) is reduced by 1, and the updated weighted values are then recorded.

In another exemplary embodiment, for making the virtual local area networks deployed in the virtual local area network configuration system connectable to an external network, the virtual local area network configuration system proposed by the present disclosure may further include a plurality of routers. The routers may be connected to the Ethernet switches. When the virtual local area network formed by one specific VLAN group needs to connect to the external network, the network controller may add a suitable router to such VLAN group as the member physical machine and create the corresponding virtual topology.

Figure 8:
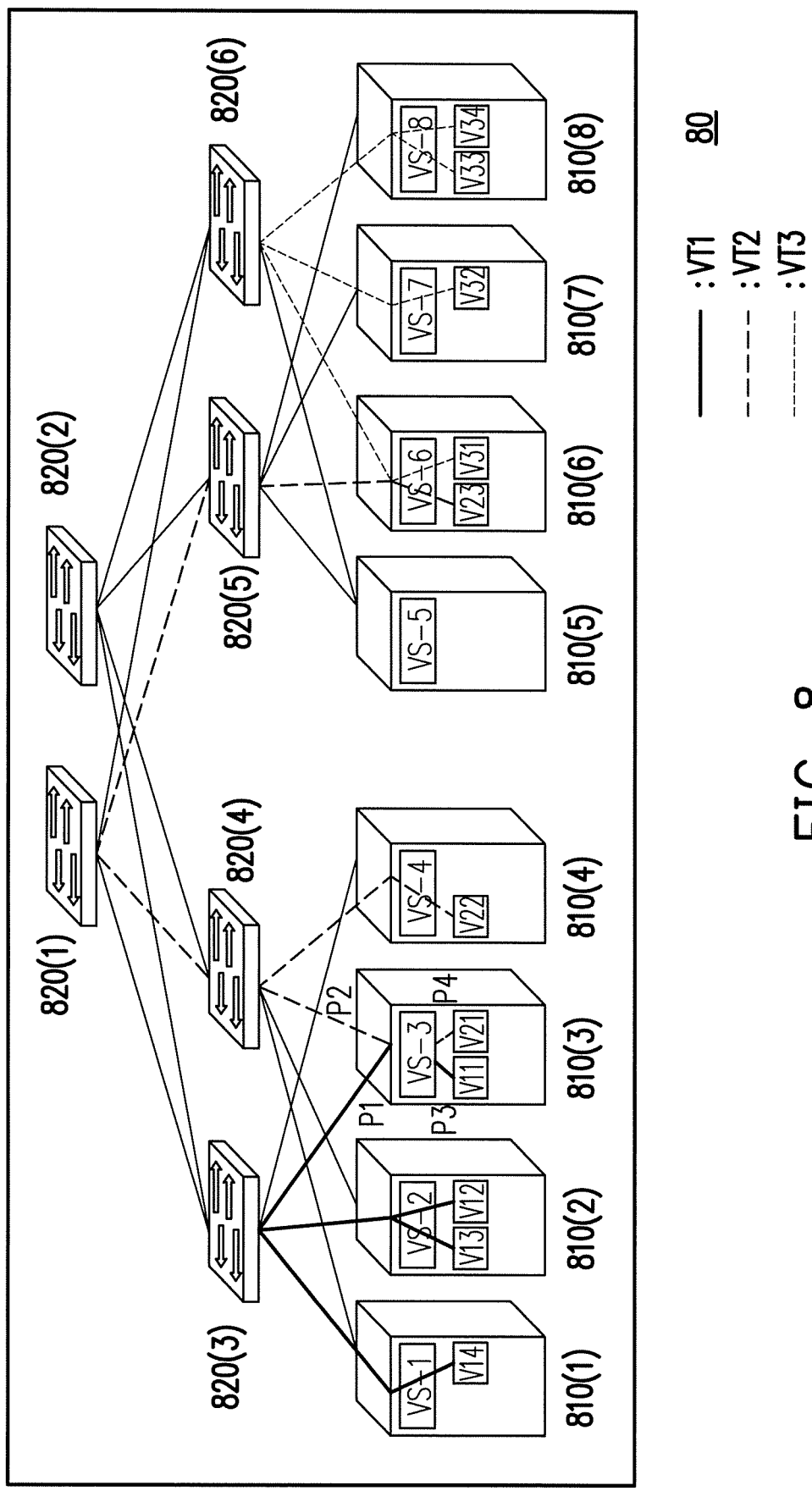
FIG. 8 illustrates a schematic diagram of the virtual switches forwarding packets according to an exemplary embodiment of the present disclosure.

FIG. 8 illustrates a schematic diagram of the virtual switches forwarding packets according to an exemplary embodiment of the present disclosure.

Referring to FIG. 8, a virtual local area network configuration system 80 includes physical machines 810(1) to 810(8) disposed with virtual switches VS-1 to VS-8 respectively. The virtual local area network configuration system 80 is deployed with three VLAN groups corresponding to virtual topologies VT1 to VT3 respectively. VLAN IDs of the three VLAN groups are VLAN_1. The network controller 130 in the preset disclosure sets the packet forwarding rule in the virtual switch according to the deployed VLAN groups and the corresponding virtual topologies so the virtual switch can transmit the packet according to the packet forwarding rule. In other words, when the virtual switch receives the packet, the virtual switch compares conditions matched by the packet according to the packet forwarding rule so as to execute corresponding actions. If the packet came from outside the physical machine, the virtual switch may decide the port for transmitting the packet according to conditions matched by a source port and a virtual local area network tag (VLAN tag) of the packet. If the packet came from inside the physical machine, the virtual switch may decide the port for transmitting the packet and the VLAN tag to be added to the packet according to the source port of the packet. Aforesaid VLAN tag corresponds to the VLAN ID, and is configured to mark the VLAN ID of the virtual local area network to which the packet belongs.

Taking the virtual switch VS-3 for example, if the packet came from inside the physical machine 810(3) and the source port of the packet is a port P3 (i.e., came from a virtual machine V11), the virtual machine VS-3 may add the corresponding VLAN tag VLAN_1 to the packet and transmits the packet from a port P1 to the corresponding virtual local area network via the virtual topology VT1. Similarly, if the source port of the packet is a port P4 (i.e., came from a virtual machine V21), the virtual machine VS-3 may add the corresponding VLAN tag VLAN_1 to the packet and transmits the packet from a port P2 to the corresponding virtual local area network via the virtual topology VT2. On the other hand, if the packet came from outside the physical machine 810(3), the source port of the packet is the port P1 and the VLAN tag of the packet is VLAN_1, the virtual switch VS-3 transmits the packet from the port P3 to the virtual machine V11. Similarly, if the source port of the packet is the port P2 and the VLAN tag of the packet is VLAN_1, the virtual switch VS-3 transmits the packet from the port P4 to the virtual machine V21.

Figure 9:
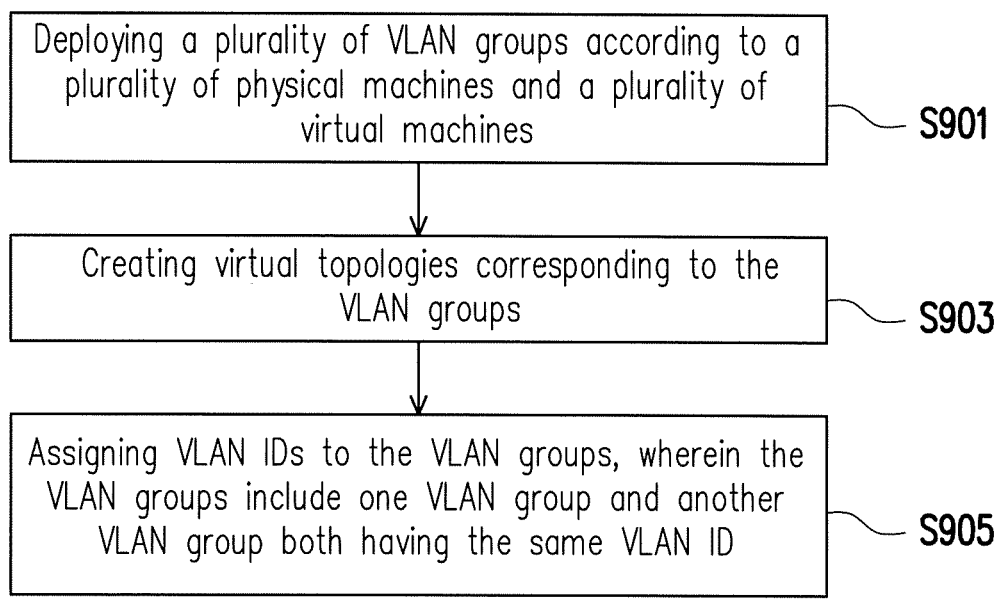
FIG. 9 is a flowchart illustrating the virtual local area network configuration method according to an exemplary embodiment of the present disclosure.

FIG. 9 is a flowchart illustrating the virtual local area network configuration method according to an exemplary embodiment of the present disclosure.

With reference to FIG. 9, in step S901, the network controller 130 deploys a plurality of VLAN groups according to a plurality of physical machines and a plurality of virtual machines. Each VLAN group includes multiple physical machines among the physical machines and multiple virtual machines among the virtual machines.

In step S903, the network controller 130 creates virtual topologies corresponding to the VLAN groups.

In step S905, the network controller 130 assigns VLAN IDs to the VLAN groups, and the VLAN groups include one VLAN group and another VLAN group both having the same VLAN ID.

Figure 10:
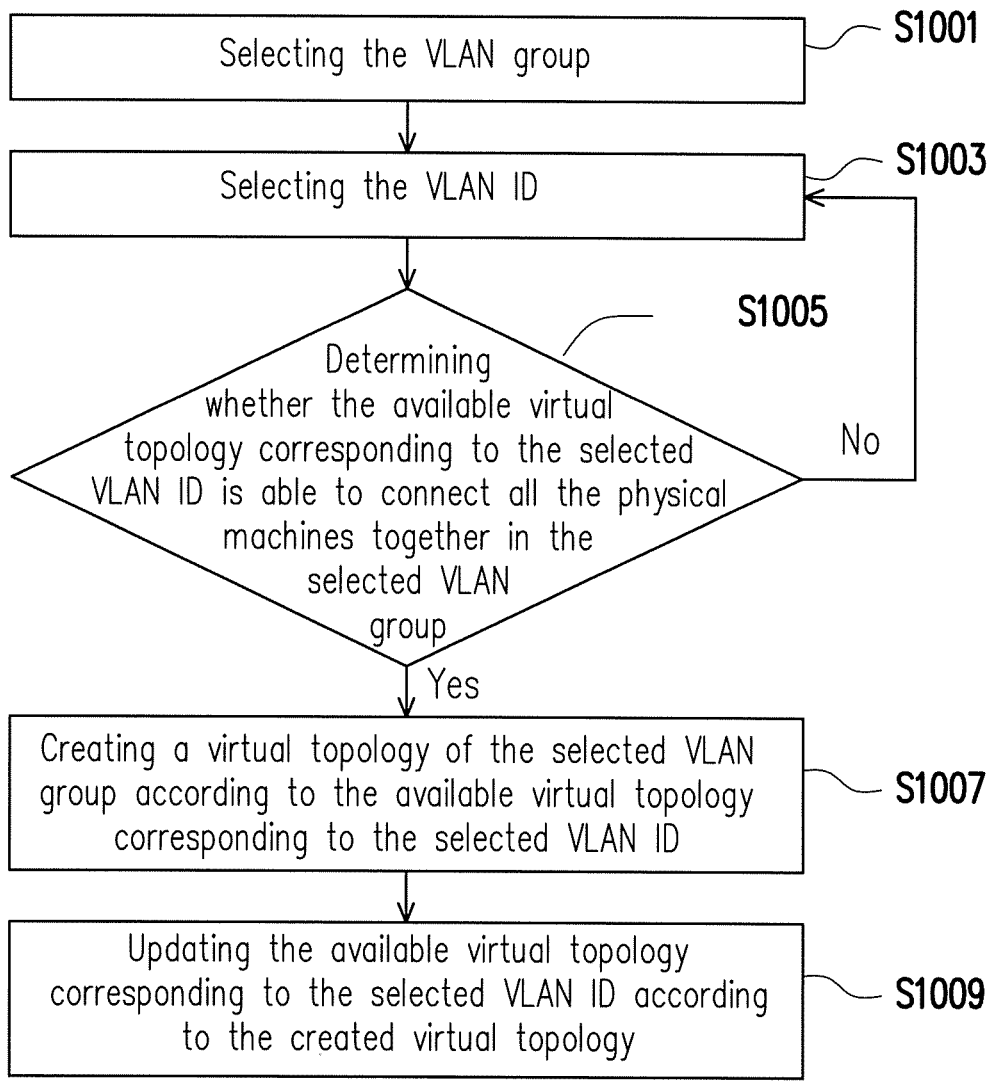
FIG. 10 is a flowchart illustrating detailed steps for creating the virtual topology according to step S903 of FIG. 9 in the virtual local area network configuration method of the present disclosure.

FIG. 10 is a flowchart illustrating detailed steps for creating the virtual topology according to step S903 of FIG. 9 in the virtual local area network configuration method of the present disclosure.

With reference to FIG. 10, in step S1001, the network controller may select the VLAN group. For example, the network controller 130 may decide the VLAN groups to be selected according to the number of physical machines in each VLAN group.

In step S1003, the network controller 130 selects the VLAN ID. For example, the network controller 130 may decide the VLAN ID to be selected according to a size of an available virtual topology of each VLAN group. The size of the available virtual topology may be the number of Ethernet switches in the available virtual topology.

In step S1005, the network controller 130 may determine whether the available virtual topology corresponding to the selected VLAN ID is able to connect all of the physical machines together in the selected VLAN group. For example, the network controller 130 uses the BFS algorithm to search for the physical machines of the selected VLAN group in the available virtual topology. After visiting all of the nodes in the corresponding available virtual topology, if the network controller 130 is still unable to find all of the physical machines in the selected VLAN group, it means that the available virtual topology corresponding to the selected VLAN ID is unable to connect all of the physical machines together in the selected VLAN group. On the other hand, if the network controller 130 can find all of the physical machines in the selected VLAN group with the available virtual topology corresponding to the selected VLAN ID, it means that the corresponding available virtual topology can connect all of the physical machines together in the VLAN group. Details regarding the above have been described in the foregoing exemplary embodiment, which is not repeated hereinafter.

When the available virtual topology corresponding to the selected VLAN ID is unable to connect all of the physical machines together in the selected VLAN group, the network controller 130 executes step S1003 again.

If the available virtual topology corresponding to the selected VLAN ID is able to connect all of the physical machines in the selected VLAN group, in step S1007, the network controller 130 creates a virtual topology of the selected VLAN group according to the available virtual topology corresponding to the selected VLAN ID.

In step S1009, the network controller 130 updates the available virtual topology corresponding to the selected VLAN ID according to the created virtual topology.

In the present disclosure, a computer program product is further proposed and configured to execute each step in the virtual local area network configuration method mentioned above. The computer program product includes a plurality of program commands, and is able to complete aforesaid virtual local area network configuration method and realize functions of the virtual local area network system after the program commands are loaded and executed by the network controller 130 in the virtual local area network configuration system.

In summary, the present disclosure can allow the same VLAN ID to be assigned to the different VLAN groups by creating the virtual topology of the VLAN group by using the available virtual topology corresponding to the VLAN ID. Consequently, the length limitation of the VLAN IDs in the current communication environment can be broken through to deploy a greater number of virtual local area networks in the network system. Moreover, the present disclosure can be used to create the virtual topology by preferentially selecting the links used by fewer virtual local area networks groups according to the weighted values of the links. As a result, a load balancing can be achieved to further improve overall performance for the network.

It will be apparent to those skilled in the art that various modifications and variations can be made to the disclosed embodiments. It is intended that the specification and examples be considered as exemplary only, with a true scope of the present disclosure being indicated by the following claims and their equivalents.

The invention claimed is:

1. A virtual local area network configuration system, comprising: a plurality of physical machines running a plurality of virtual machines; a plurality of Ethernet switches connected to the physical machines through a plurality of links; and a network controller connected to the Ethernet switches, the network controller deploying a plurality of VLAN groups according to the physical machines and the virtual machines, wherein each VLAN group among the VLAN groups comprises at least one physical machine among the physical machines and at least one virtual machine among the virtual machines, wherein the network controller maintains a plurality of available virtual topologies respectively corresponding to a plurality of VLAN IDs, and each available virtual topology among the available virtual topologies comprises at least part of Ethernet switches among the Ethernet switches, wherein the network controller creates a plurality of virtual topologies corresponding to the VLAN groups, and assigns the VLAN IDs separately to the VLAN groups, wherein the network controller selects a first VLAN group from the VLAN groups, wherein the network controller selects a first VLAN ID from the VLAN IDs, and when a first available virtual topology corresponding to the first VLAN ID among the available virtual topologies is able to connect all of the physical machines together in the first VLAN group, the network controller creates a first virtual topology corresponding to the first VLAN group according to the first available virtual topology and updates the first available virtual topology according to the first virtual topology, wherein the network controller assigns the first VLAN ID to the first VLAN group, wherein the VLAN groups comprise a VLAN group and another VLAN group, and the VLAN group and the another VLAN group have the same VLAN ID, and wherein the network controller records a weighted value for each link among the links, wherein the network controller creates the virtual topologies according to the weighted values of the links, and updates the weighted values according to the created virtual topologies.

2. The virtual local area network configuration system of claim 1, wherein the network controller selects the first VLAN group from the VLAN groups according to a number of physical machines in each VLAN group among the VLAN groups.

3. The virtual local area network configuration system of claim 1, wherein the network controller selects the first VLAN ID from the VLAN IDs according to a number of Ethernet switches in each available virtual topology among the available virtual topologies.

4. The virtual local area network configuration system of claim 1, wherein the physical machines, the Ethernet switches and the links form a physical topology, wherein when the first virtual topology corresponding to the first VLAN group is not creatable according to the available virtual topologies corresponding to the VLAN IDs, the network controller determines whether the first VLAN group includes a first virtual machine, wherein the first virtual machine runs independently on a first physical machine among the physical machines and the first VLAN group includes the first physical machine, and when the first VLAN group includes the first virtual machine, the network controller resettles the first virtual machine in a second physical machine, wherein the first VLAN group includes the second physical machine, wherein the first VLAN group further includes a third physical machine, and a length of a shortest path between the second physical machine and the third physical machine is less than a length of a shortest path between the first physical machine and the third physical machine in the physical topology.

5. The virtual local area network configuration system of claim 1, wherein the network controller creates the virtual topologies by using a Breadth-First-Search algorithm according to the weighted values of the links.

6. The virtual local area network configuration system of claim 5, wherein the network controller calculates a VLAN group count for each link among the links, and sets the weighted values of the links separately as the VLAN group counts of the links, wherein the VLAN group counts of the links are respectively the numbers of the VLAN groups using the links.

7. The virtual local area network configuration system of claim 1, wherein the VLAN groups comprise a second VLAN group,
wherein the network controller adds a second virtual machine to the second VLAN group, and deploys the second virtual machine in one of the physical machines of the second VLAN group.

8. The virtual local area network configuration system of claim 7, wherein the second VLAN group is configured with a second virtual topology and a second VLAN ID,
wherein when the second virtual machine is not deployable in the physical machines of the second VLAN group, the network controller deploys the second virtual machine in a fourth physical machine,
wherein the network controller updates a second available virtual topology corresponding to the second VLAN ID according to the second virtual topology, updates the second VLAN group to generate an updated second VLAN group according to the fourth physical machine, and creates a virtual topology of the updated second VLAN group according to the updated second available virtual topology.

9. The virtual local area network configuration system of claim 1, wherein the VLAN groups comprise a third VLAN group, the third VLAN group is configured with a third virtual topology and includes a to-be-removed virtual machine and a fifth physical machine, the to-be-removed virtual machine runs on the fifth physical machine,
wherein the network controller determines whether the to-be-removed virtual machine runs independently on the fifth physical machine, and
when the to-be-removed virtual machine runs independently on the fifth physical machine, the network controller unidirectionally searches for a first Ethernet switch having at least two branch paths starting from the fifth physical machine in the third virtual topology and removes all paths between the fifth physical machine and the first Ethernet switch in the third virtual topology.

10. A virtual local area network configuration method for a virtual local area network configuration system, the virtual local area network configuration system comprising a plurality of physical machines and a plurality of Ethernet switches, the Ethernet switches being connected to the physical machines through a plurality of links, the physical machines running a plurality of virtual machines, the method comprising:
deploying a plurality of VLAN groups according to the physical machines and the virtual machines, wherein each VLAN group among the VLAN groups comprises at least one physical machine among the physical machines and at least one virtual machine among the virtual machines;
maintaining a plurality of available virtual topologies respectively corresponding to a plurality of VLAN IDs, each available virtual topology among the available virtual topologies comprising at least part of Ethernet switches among the Ethernet switches;
creating a plurality of virtual topologies corresponding to the VLAN groups wherein the step of creating the virtual topologies corresponding to the VLAN groups comprises:
selecting a first VLAN group from the VLAN groups;
selecting a first VLAN ID from the VLAN IDs;
when a first available virtual topology corresponding to the first VLAN ID among the available virtual topologies is able to connect all of the physical machines together in the first VLAN group, creating a first virtual topology corresponding to the first VLAN group according to the first available virtual topology; and
updating the first available virtual topology according to the first virtual topology; and assigning the VLAN IDs separately to the VLAN groups, wherein the step of assigning the VLAN IDs separately to the VLAN groups comprises:
assigning the first VLAN ID to the first VLAN group, wherein the VLAN groups comprise a VLAN group and another VLAN group, and the VLAN group and the another VLAN group have the same VLAN ID, and the method further comprising: recording a weighted value for each link among the links, wherein the step of creating the virtual topologies corresponding to the VLAN groups comprises: creating the virtual topologies according to the weighted values of the links; and updating the weighted values according to the created virtual topologies.

11. The virtual local area network configuration method of claim 10, wherein the step of selecting the first VLAN group from the VLAN groups comprises:
selecting the first VLAN group from the VLAN groups according to a number of physical machines in each VLAN group among the VLAN groups.

12. The virtual local area network configuration method of claim 10, wherein the step of selecting the first VLAN ID from the VLAN IDs comprises:
selecting the first VLAN ID from the VLAN IDs according to a number of Ethernet switches in each available virtual topology among the available virtual topologies.

13. The virtual local area network configuration method of claim 10, wherein the physical machines, the Ethernet switches and the links form a physical topology, wherein the step of creating the virtual topologies corresponding to the VLAN groups further comprises:
when the first virtual topology corresponding to the first VLAN group is not creatable according to the available virtual topologies corresponding to the VLAN IDs, determining whether the first VLAN group includes a first virtual machine, wherein the first virtual machine runs independently on a first physical machine among the physical machines and the first VLAN group includes the first physical machine; and
when the first VLAN group includes the first virtual machine, resettling the first virtual machine in a second physical machine, wherein the first VLAN group includes the second physical machine,
wherein the first VLAN group further includes a third physical machine, and a length of a shortest path between the second physical machine and the third physical machine is less than a length of a shortest path between the first physical machine and the third physical machine in the physical topology.

14. The virtual local area network configuration method of claim 10, wherein the step of creating the virtual topologies corresponding to the VLAN groups comprises: creating the virtual topologies by using a Breadth-First-Search algorithm according to the weighted values of the links.

15. The virtual local area network configuration method of claim 14, further comprising:
calculating a VLAN group count for each link among the links, and setting the weighted values of the links separately as the VLAN group counts of the links, wherein the VLAN group counts of the links are respectively numbers of the VLAN groups using the links.

16. The virtual local area network configuration method of claim 10, wherein the VLAN groups comprise a second VLAN group, and the method further comprises:
adding a second virtual machine to the second VLAN group; and
deploying the second virtual machine in one of the physical machines of the second VLAN group.

17. The virtual local area network configuration method of claim 16, wherein the second VLAN group is configured with a second virtual topology and a second VLAN ID, wherein the step of deploying the second virtual machine in said one of the physical machines of the second VLAN group comprises:
when the second virtual machine is not deployable in the physical machines of the second VLAN group, deploying the second virtual machine in a fourth physical machine;
updating a second available virtual topology corresponding to the second VLAN ID according to the second virtual topology;
updating the second VLAN group to generate an updated second VLAN group according to the fourth physical machine; and
creating a virtual topology of the updated second VLAN group according to the updated second available virtual topology.

18. The virtual local area network configuration method of claim 10, wherein the VLAN groups comprise a third VLAN group, the third VLAN group is configured with a third virtual topology and includes a to-be-removed virtual machine and a fifth physical machine, the to-be-removed virtual machine is deployed on the fifth physical machine, and the method further comprises:
determining whether the to-be-removed virtual machine runs independently on the fifth physical machine;
when the to-be-removed virtual machine is configured independently in the fifth physical machine, unidirectionally searching for a first Ethernet switch having at least two branch paths starting from the fifth physical machine in the third virtual topology; and
removing all paths between the fifth physical machine and the first Ethernet switch in the third virtual topology.

19. A non-transitory computer program product, the computer program product comprising at least one program command and being capable of completing the method of claim 10 after the at least one program command is loaded and executed by an electronic device.

* * * * *